United States Patent [19]

Viallard et al.

[11] Patent Number: 5,762,831
[45] Date of Patent: Jun. 9, 1998

[54] COMPOSITE NUCLEAR FUEL MATERIAL AND METHOD OF MANUFACTURE OF THE MATERIAL

[75] Inventors: Isabelle Viallard, Manosque; Jean-Marc Bonnerot, Puyricard; Jean-Pierre Fleury, Manosque, all of France

[73] Assignee: Commissariat a l'Energie Atomique, Paris, France

[21] Appl. No.: 796,910

[22] Filed: Feb. 6, 1997

[30] Foreign Application Priority Data

Feb. 7, 1996 [FR] France ..................... 96 01500

[51] Int. Cl.⁶ ........................................ G21C 21/00
[52] U.S. Cl. ............... 252/638; 252/643; 264/0.5; 501/152
[58] Field of Search .................. 252/638, 643; 501/152; 264/0.5

[56] References Cited

U.S. PATENT DOCUMENTS

| | | | |
|---|---|---|---|
| 3,657,137 | 4/1972 | Burke et al. | 252/638 |
| 3,867,489 | 2/1975 | Rubin | 264/0.5 |
| 4,512,939 | 4/1985 | Dön et al. | 264/0.5 |
| 4,671,904 | 6/1987 | Dön et al. | 264/0.5 |

FOREIGN PATENT DOCUMENTS

| | | | |
|---|---|---|---|
| 1116663 | 6/1968 | United Kingdom | G21C 3/62 |
| 1285190 | 8/1972 | United Kingdom | G21C 3/62 |
| 2107691 | 5/1983 | United Kingdom | C04B 35/64 |

Primary Examiner—Ngoclan Mai
Attorney, Agent, or Firm—Pearne, Gordon, McCoy & Granger LLP

[57] ABSTRACT

This invention relates to a composite nuclear fuel material and method of manufacture of said material.

The purpose of the invention is a composite nuclear fuel material comprising a matrix inert under irradiation and particles of nuclear fuel offering good resistance to fissure propagation under irradiation and high retention of volatile fission products.

This purpose is achieved using a method which allows the creation of a clearance of a few microns between the particles and the matrix.

40 Claims, 1 Drawing Sheet
(1 of 2 Drawing(s) in Color)

COMPOSITE NUCLEAR FUEL MATERIAL AND METHOD OF MANUFACTURE OF THE MATERIAL

DESCRIPTION

This invention relates to a nuclear fuel material having in particular good resistance to fissure propagation under irradiation and high retention of volatile fission products, and to a method of manufacture of said composite nuclear fuel material.

During the use of nuclear fuels, numerous problems arise relating in particular to the mechanical resistance of the fuels under irradiation. Fuel swelling under irradiation and the release of volatile fission products lead to local stress formation and may cause fissuring of the fuel leading to rupture of the fuel sheath. The inner pressure of the sheaths and the interaction of fissure products with these sheaths must therefore be restricted. This is why the quality of the fuel used is most important, and any change made with a view to improving the performance of current fuel must seek to limit sheath-fuel interactions.

In the document <<Les techniques de l'ingénieur >> (Génie Energétique B811 3620-11/5.12) fuel pellets are made from $UO_2$ powder to which $U_3O_8$ is added to improve the solidity of the raw fuel pellets. The raw fuel pellets are manufactured at high pressure and adherence of the $UO_2$/$U_3O_8$ grains is helped by the addition of zinc stearate. This document also describes the possibility of adding porogenic products to the fuel. The raw pellets obtained are then sintered at high temperature.

Patent application FR-A-2 706 066 describes a nuclear fuel containing $UO_2$ having improved retention properties of fission products. In this document the fuel comprises a metal such as Cr or Mo able to trap the oxygen derived from nuclear fission to form an oxide.

None of the documents cited, however, simultaneously resolve the problems raised by swelling of the nuclear fuel under irradiation and by the release of volatile fission products, which lead to local stresses within the material.

The aim of the present invention is precisely to provide a new fuel material which resolves the above-mentioned problems, and a method of manufacture of said fuel material.

This new type of composite nuclear fuel material comprises a ceramic matrix that is inert under irradiation in which particles of nuclear fuel are dispersed with a clearance of 1 to 10 μm between the matrix and the particles, the matrix having a lower thermal expansion coefficient than that of said fuel particles.

This matrix is inert under irradiation, and has a reduced efficient neutron absorption section and reduced swelling under irradiation.

Matrices having such properties are for example ceramics such as spinels, such as the spinel $MgAl_2O_4$, oxides such as MgO magnesia or yttrium oxide $Y_2O_3$. Preferably, the matrix used is the spinel $MgAl_2O_4$.

The prior art cites matrices such as beryllium oxide, aluminium oxide and zirconium oxide, but these matrices have numerous disadvantages. Beryllium oxide is a neutron moderator, and aluminium oxide and zirconium oxide show a swelling effect under irradiation. Moreover, zirconium oxide becomes soluble in $UO_2$ from 1200° C. upwards (phase change). All these disadvantages prevent a fuel material with the required properties from being obtained.

The particles of nuclear fuel may be of several types, generally oxide particles are used such as $UO_2$ or particles of mixed oxides containing $UO_2$, such as $UO_2$—$PuO_2$, $UO_2$—$ThO_2$. Also, various additives may be added such as the known additives used to adjust grain size and/or to improve the retention of fission products.

Preferably, the particles of nuclear fuel used in the present invention are particles of $UO_2$.

Particle size is chosen in such manner as to obtain, after sintering, a clearance of a few μm between the particles and the matrix. Generally, particles of 70 to 230 μm are used, preferably of 90 to 120 μm. The proportion of $UO_2$ in the nuclear fuel material is generally between 20 and 40% by volume of nuclear fuel material in order to obtain a material of the invention having the required properties.

The clearance between the matrix and the particles allows the creation of an expansion volume for the volatile fission products and allows partial accommodation of part of the swelling of the $UO_2$ fuel under irradiation, thereby limiting local stresses created during use of the nuclear fuel and therefore delaying damage to the $UO_2$ particles and to the matrix.

Also, the nuclear fuel material of the present invention has better thermal conductivity than that of $UO_2$ alone. The fuel temperature reached during reactor irradiation leads to a decrease in the thermal gradient obtained between the centre and the periphery of the pellet, which is favourable for the retention of fission products, the phenomenon of fission product diffusion for $UO_2$ being heat activated.

Moreover, the nuclear fuel material of the invention offers better resistance to fissure propagation within the pellet. The clearance which exists between the fuel particles and the matrix causes deflection of the fissures created during irradiation.

The present invention also provides a method for obtaining the nuclear fuel material comprising the following stages:

a) mixing the particles of a nuclear fuel precursor having diameters which lie within given particle size limits, with a powder of a material intended to form the ceramic matrix, inert under irradiation, b) compressing the mixture into shape, and c) sintering the compressed mixture in a reducing atmosphere comprising $H_2O$, for example by heat treatment, and under conditions such that the crystalline lattice volume of the precursor of the nuclear fuel is reduced during heat treatment.

If the fuel must be $UO_2$, the precursor which may be used offering this characteristic crystal lattice volume reduction is either $U_3O_8$ or a $U_3O_8$—$UO_2$ mixture. During the conversion of the $U_3O_8$ oxide of orthorhombic structure into uranium dioxide $UO_2$ of cubic structure, a clearance of a few microns is formed between the matrix and the particles through a reduction in the crystal lattice volume of the fuel.

During mixing of the precursor particles with the matrix powder, it is essential to eliminate the large agglomerates of matrix powder which may be formed during mixing, in such manner as to optimise performance during pressing and subsequent densification.

The mixing stage is most important since it conditions the final homogeneity of the composite fuel. It must be conducted gently in order not to create additional fines.

Mixing may be carried out by mechanical stirring for at least 30 min. using for example a blade mixer or a TURBULA mixer, set at low speed for example 20 rpm.

Cold compression of the mixture, in particular into pellet form, may be conducted using conventional methods. It can for example be made using a hydraulic press, preferably a twin effect press.

Also, a twofold pressing cycle with an intermediate stop will limit the defects related to poor distribution of the mixture in the press matrix. With this press a first compression stage can be carried out at a pressure of 30 to 50 MPa, followed by a second stage at a pressure of 300 to 350 MPa. Each stage comprises a pressure rise period, a pressure holding period, and a pressure lowering period.

It is strongly recommended to lubricate the press matrix with a lubricant, zinc stearate for example, in aerosol form before compressing the powder.

Also, the transfer time of the powder mixture, made up of the matrix and fuel particles, from the preparation post to the press must be sufficiently short in order to restrict segregation of the particles in the matrix powder, which would deteriorate the homogeneity of the fuel pellets. Any distribution defect at this level of manufacture would lead to defects that cannot be resorbed defects during sintering.

Sintering is conducted under conditions (temperature, time, atmosphere) which allow conversion of the precursor into fuel and proper densification of both materials (fuel and matrix).

In order to obtain conversion of the precursor into fuel, in respect of $U_3O_8$ particles, a damp reducing atmosphere must be used. This is preferably made up of hydrogen humidified for example at 2% water volume, which will allow full reduction of $U_3O_8$ into $UO_2$ to be obtained, at a temperature of less than 600° C. Humidification allows activation of cationic diffusion during sintering and contributes towards densification of both materials. The reducing atmosphere may also be made up of a humidified mixture of hydrogen and inert gas, such as argon.

When pure humidified hydrogen is used, or the humidified hydrogen argon mixture, the partial pressure ratio $pH_2/pH_2O$ ratio is 40 to 60, preferably in the region of 50.

Sintering temperature and time are chosen in relation to the materials used as fuel and matrix. Temperatures of 1640° to 1700° C. for example may be used. For the spinel $MgAl_2O_4$, for example, the sintering temperature is 1650° C.

For sintering, the treatment cycle may successively comprise a rise in temperature at a rate of approximately 100° to 300° C./h until sintering temperature is reached, holding sintering temperature for approximately one hour and lowering temperature to room temperature at a rate of 150° to 350° C./h.

According to the invention, with this method it is possible to obtain a nuclear fuel material using a ceramic matrix inert under irradiation and a precursor of a nuclear fuel, characterized in that it obtains a clearance between the fuel particles and the matrix, created through the conversion of the precursor into fuel leading to a decrease in particle size.

For example, the precursor of the particles being $U_3O_8$ of orthorhombic structure, $UO_2$ particles are obtained which have a smaller crystalline lattice volume of cubic structure than that of $U_3O_8$. The conversion of $U_3O_8$ into $UO_2$ is conducted at low temperature, less than 600° C.

The decrease in elementary crystal lattice size, in the region of 21% by volume, achieves a clearance at the interface between the matrix and the $UO_2$ particles before the densification process of the $UO_2$ particle and spinel matrix mixture is started.

The clearance is only partially recovered during sintering since both components have comparable densification kinetics during sintering and since the onset of densification for both components is simultaneous.

The method of manufacture of the precursor particles may be carried out by using the following stages:

1) pressing the precursor powder in order to obtain raw pressings
2) crushing the raw pressings to obtain granules
3) screening the granules
4) spheroidising the screened granules into precursor particles, and
5) eliminating, through screening, those precursor particles whose diameter lies outside the given particle size limits.

When the fuel precursor is $U_3O_8$, it may be obtained by calcination of the $UO_2$ powder at a temperature of 450° to 500° C. This calcination is conducted, for example, in alumina or Inconel vessels.

When the precursor is a mixture of $UO_2$ and $U_3O_8$ powders, the $U_3O_8$ powder may be prepared as previously and then the required quantity of $UO_2$ powder added.

The subsequent preparation stages for the particles of $U_3O_8$ fuel precursor consist of pressing, for example at 100 MPa, the $U_3O_8$ powder or a mixture of $UO_2$—$U_3O_8$ in order to obtain raw pressings, crushing said raw pressings using an oscillating granulator for example in order to obtain granules, screening said granules, spheroidising them into particles, and eliminating by screening those particles that do not come within the given particle size limits.

The granules obtained by crushing the raw pressings of $U_3O_8$ must be round-shaped with no sharp corners.

The crushed granules are then screened. The screening of the granules is carried out using a screen preferably in stainless steel. The mesh of the screen used must be adapted to the particle size or size of required particles, providing for a volume decrease due to the change in crystalline structure during heat treatment.

The extent of clearance obtained after sintering depends in particular upon the size of the fuel precursor particles.

Screening is for example conducted to collect particles of between 100 and 300 µm, preferably of 120 to 160 µm. If 120 to 160 mm screening is made, the diameter of the particles obtained after sintering will be between 90 and 120 µm.

Spheroidising is carried out in a mixer, a TURBULA mixer for example, in a spherical container positioned at the centre of gravity of the mixer enclosure for at least 20 h.

BRIEF DESCRIPTION OF THE DRAWINGS

Other characteristics and advantages of the invention will better appear on reading the following example, which is evidently non-restrictive and given for illustrative purposes, with reference to the appended drawings, in which.

In this example, a composite nuclear fuel material is prepared comprising a spinel matrix $MgAl_2O_4$ in which particles of $UO_2$ nuclear fuel are dispersed.

The first phase of manufacture of the composite nuclear fuel material consists of preparing precursor particles of $UO_2$ fuel, which are $U_3O_8$ particles.

The $UO_2$ powder is calcined in air at a temperature of 500° C. for 2 hours, in order to obtain a superior $U_3O_8$ oxide powder.

For this operation, the $UO_2$ powder is poured into alumina vessels. The height of the powder bed is less than 3 cm so that full oxidation may take place throughout the entire volume of powder. Raw $U_3O_8$ powder is obtained.

The raw $U_3O_8$ powder is then pressed into tablet-form at a pressure of 100 MPa using a twin-effect hydraulic press. The raw pressings obtained are then gently crushed in order to obtain round-shaped granules, free of any sharp corners using an oscillating granulator.

The granules obtained are screened using a stainless steel screen with mesh openings of 125 and 160 µm. The $U_3O_8$ granules obtained after screening are then made spheroid. Spheroidising is conducted in a TURBULA mixer, for 20 hours, in a spherical container positioned at the centre of gravity of the mixer enclosure. After spheroidising, the fine particles that do not come within the particle size limits (125 to 160 µm) are eliminated by screening.

The second phase of manufacture of the composite nuclear fuel material consists of preparing the composite material.

The $U_3O_8$ particles obtained during the first phase of manufacture of the composite material are incorporated into a matrix powder; the matrix powder is the spinel $MgAl_2O_4$. During incorporation, the large agglomerates of spinel powder formed are eliminated in order to optimise performance during pressing and subsequent densification.

Mixing of the $U_3O_8$ particles and $MgAl_2O_4$ spinel matrix is then carried out by mechanical stirring for 30 min. at least, using a blade mixer set at a low speed of 20 rpm.

The mixture obtained is then compressed using a twin-effect hydraulic press, with a first stage at 50 MPa comprising a period of pressure-rise for 3 seconds, a pressure-holding period of 4 seconds and a pressure-lowering period of 3 seconds, followed by a second stage at 300 MPa comprising a pressure-rise period of 2 seconds, a pressure-holding period of 4 seconds and a pressure-lowering period of 3 seconds. The press matrix is lubricated with a zinc stearate aerosol.

The compressed mixture of spinel matrix/$U_3O_8$ precursor is then subjected to heat treatment in a sintering oven.

This heat treatment is conducted in a $H_2+2\%H_2O$ reducing atmosphere for 1 hour at 1650° C. and successively consists of raising the temperature at a rate of 150° C./h until the sintering temperature of 1650° C. is reached, holding this temperature for 1 hour and lowering the temperature to room temperature at the rate of 300° C./h.

Figure 1:
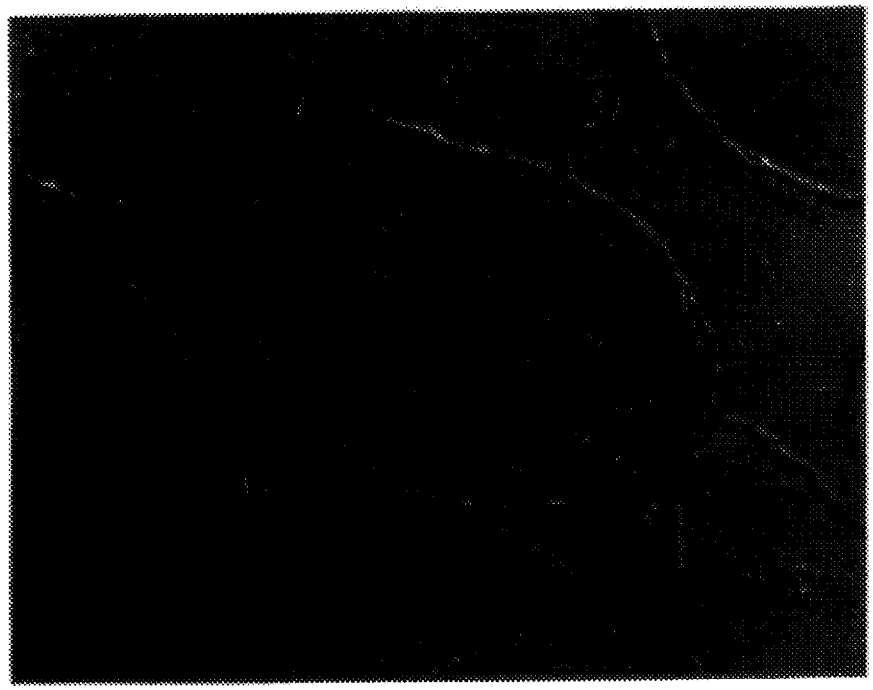
FIG. 1 represents a metallograph section (magnification 500) of $UO_2$ particles with a diameter of 90 to 120 µm, dispersed in a $MgAl_2O_4$ spinel matrix, and shows the clearance of 1 to 2 µm between the matrix and the $UO_2$ particles.

The final density of the pellets obtained in this example is more than 94% of the theoretical density. The spinel matrix and the $UO_2$ particles appear very dense as is shown in the metallograph section of FIG. 1. The final retraction of the pellets is about 21% ; it is higher than the retraction of a $UO_2$ spinel composite with perfect contact between matrix and particles. Part of the initial clearance created between matrix and particles is therefore recovered. The densification kinetics of the composite material during sintering therefore match those of the spinel matrix.

The presence of the particles does not therefore disturb the densification kinetics of the material. The start of densification of both phases taken separately is simultaneous, but the $UO_2$ particles have a faster densification rate than the $MgAL_2O_4$ spinel at the start of sintering. The partial recovery of the clearance between matrix and particles is accounted for by the higher densification rate of the spinel from 1300° C. upwards. At this temperature the sintering kinetics of uranium dioxide show deceleration whereas those of the spinel have not yet reached their maximum.

The lack of contact between the particles and matrix is demonstrated during polishing of the samples of the nuclear fuel material of the invention, when stripping is observed of those particles whose residual diameter after sectioning is shorter than the real diameter of the $U_3O_8$ particle are stripped. These strippings are the more numerous, the greater the size of the initial $U_3O_8$ particles, as the clearance created is of greater thickness.

Figure 2:
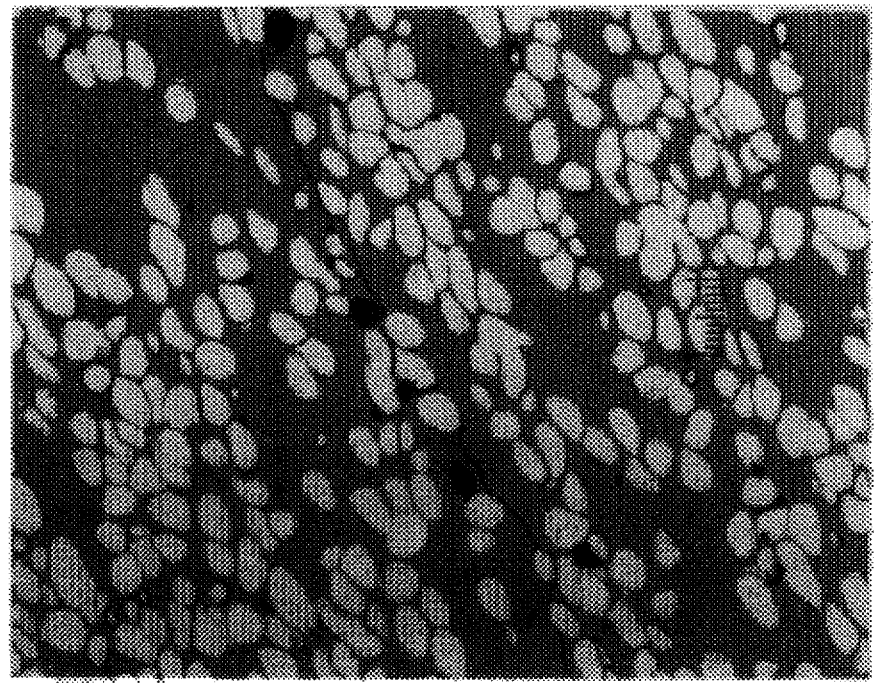
FIG. 2 represents a metallograph section (magnification 50) of $UO_2$ particles with a diameter of 90 to 120 µm dispersed in a $MgAl_2O_4$ spinel matrix, and shows the deflection of fissures through the clearance between the matrix and the particles.

The fissure deflection phenomenon is illustrated in FIG. 2. The fissure passes round the particle at the interface level where resistance is less. Fissure branches and breaks are visible indicating reinforcement of the material.

Stress release at the interface appears as a decrease in the percentage of fissured $UO_2$ particles within the composite material.

We claim:

1. Composite nuclear fuel material comprising a ceramic matrix inert under irradiation in which particles of nuclear fuel are dispersed, with a clearance of 1 to 10 µm between the matrix and the particles, the matrix having a lower thermal expansion coefficient than said fuel particles.

2. Nuclear fuel material in accordance with claim 1, wherein the matrix is a material selected from a group consisting of a spinel, magnesia and yttrium oxide.

3. Nuclear fuel material in accordance with claim 2, wherein the spinel is $MgAl_2O_4$.

4. Nuclear fuel material in accordance with claim 1, wherein the dispersed particles of fuel are particles of $UO_2$ or of a mixed oxide containing $UO_2$.

5. Nuclear fuel material in accordance with claim 2, wherein the dispersed particles of fuel are particles of $UO_2$ or of a mixed oxide containing $UO_2$.

6. Nuclear fuel material in accordance with claim 3, wherein the dispersed particles of fuel are particles of $UO_2$ or of a mixed oxide containing $UO_2$.

7. Nuclear fuel material in accordance with claim 1, wherein the particles dispersed in the matrix have a diameter of 70 µm to 230 µm.

8. Nuclear fuel material in accordance with claim 2, wherein the particles dispersed in the matrix have a diameter of 70 µm to 230 µm.

9. Nuclear fuel material in accordance with claim 3, wherein the particles dispersed in the matrix have a diameter of 70 µm to 230 µm.

10. Nuclear fuel material in accordance with claim 4, wherein the particles dispersed in the matrix have a diameter of 70 µm to 230 µm.

11. Nuclear fuel material in accordance with claim 5, wherein the particles dispersed in the matrix have a diameter of 70 µm to 230 µm.

12. Nuclear fuel material in accordance with claim 6, wherein the particles dispersed in the matrix have a diameter of 70 µm to 230 µm.

13. Nuclear fuel material in accordance with claim 4, wherein $UO_2$ represents 20 to 40% by volume of the nuclear fuel material.

14. Nuclear fuel material in accordance with claim 5, wherein $UO_2$ represents 20 to 40% by volume of the nuclear fuel material.

15. Nuclear fuel material in accordance with claim 6, wherein $UO_2$ represents 20 to 40% by volume of the nuclear fuel material.

16. Nuclear fuel material in accordance with claim 5, characterized in that the particles dispersed in the matrix have a diameter of 90 µm to 120 µm.

17. Method of manufacture of a composite nuclear fuel material including a ceramic matrix that is inert under irradiation and in which particles of nuclear fuel are dispersed, with a clearance of 1 to 10 μm between the matrix and the particles, the matrix having a lower thermal expansion coefficient than said fuel particles, comprising the steps of:

a) providing particles of a precursor of a nuclear fuel having diameters lying within the limits of a selected particle size range, and mixing the precursor particles with a powder of a material intended to form said ceramic matrix, b) compressing the mixture into a desired shape, and c) sintering the compressed mixture in a reducing atmosphere comprising $H_2O$ and under conditions such that the crystal lattice volume of the precursor of the nuclear fuel is reduced during heat treatment to form said composite nuclear fuel material.

18. Method of manufacture of a nuclear fuel material in accordance with claim 17, wherein said selected particle size range is 90 μm to 120 μm.

19. Method of manufacture of a nuclear fuel material in accordance with claim 17, wherein the reducing atmosphere comprises $H_2$ and $H_2O$.

20. Method of manufacture of a nuclear fuel material in accordance with claim 18, wherein the reducing atmosphere comprises $H_2$ and $H_2O$.

21. Method of manufacture of a nuclear fuel material in accordance with claim 17, wherein the reducing atmosphere is a mixture of argon, $H_2$ and $H_2O$.

22. Method of manufacture of a nuclear fuel material in accordance with claim 18, wherein the reducing atmosphere is a mixture of argon, $H_2$ and $H_2O$.

23. Method of manufacture of a nuclear fuel material in accordance with claim 19, wherein the partial pressure ratio $pH_2/pH_2O$ is 40 to 60.

24. Method of manufacture of a nuclear fuel material in accordance with claim 20, wherein the partial pressure ratio $pH_2/pH_2O$ is 40 to 60.

25. Method of manufacture of a nuclear fuel material in accordance with claim 21, wherein the partial pressure ratio $pH_2/pH_2O$ is 40 to 60.

26. Method of manufacture of a nuclear fuel material in accordance with claim 22, wherein the partial pressure ratio $pH_2/pH_2O$ from 40 to 60.

27. Method of manufacture of a nuclear fuel material in accordance with claim 17, wherein the diameter of the particles of the fuel precursor is between 100 and 300 μm.

28. Method of manufacture of a nuclear fuel material in accordance with claim 18, wherein the diameter of the particles of the fuel precursor is between 100 and 300 μm.

29. Method of manufacture of a nuclear fuel material in accordance with claim 17, wherein the diameter of the particles of the fuel precursor is between 120 and 160 μm.

30. Method of manufacture of a nuclear fuel material in accordance with claim 18, wherein the diameter of the particles of the fuel precursor is between 120 and 160 μm.

31. Method of manufacture of a nuclear fuel material in accordance with claim 17, wherein the precursor is $U_3O_8$ or a $UO_2$—$U_3O_8$ mixture.

32. Method of manufacture of a nuclear fuel material in accordance with claim 18, wherein the precursor is $U_3O_8$ or a $UO_2$—$U_3O_8$ mixture.

33. Method of manufacture of a nuclear fuel material in accordance with claim 17, wherein step (b) is conducted in two stages, the first compression stage being conducted at a pressure of 30 to 50 MPa, the second compression stage being conducted at a pressure of 300 to 350 MPa.

34. Method of manufacture of a nuclear fuel material in accordance with claim 18, wherein step (b) is conducted in two stages, the first compression stage being conducted at a pressure of 30 to 50 MPa, the second compression stage being conducted at a pressure of 300 to 350 MPa.

35. Method of manufacture of a nuclear fuel material in accordance with claim 17, wherein sintering is carried out at a temperature of 1640° to 1700° C.

36. Method of manufacture of a nuclear fuel material in accordance with claim 18, wherein sintering is carried out at a temperature of 1640° to 1700° C.

37. Method of manufacture of a nuclear fuel material in accordance with claim 17, wherein the step of providing the precursor particles includes the steps of:

1) pressing a precursor powder to obtain raw pressings,
2) crushing the raw pressing to obtain granules,
3) screening the granules,
4) spheroidising the screened granules to form said precursor particles, and
5) eliminating by screening those precursor particles whose diameter does not lie within the selected particle size limits.

38. Method of manufacture of a nuclear fuel material in accordance with claim 37, wherein said selected particle size range is 90 μm to 120 μm.

39. Method in accordance with claim 37, wherein the precursor powder is $U_3O_8$, obtained by calcination of $UO_2$ in air at a temperature of 450° C. to 500° C.

40. Method in accordance with claim 38, wherein the precursor powder is $U_3O_8$, obtained by calcination of $UO_2$ in air at a temperature of 450° C. to 500° C.

* * * * *